United States Patent Office 3,495,934
Patented Feb. 17, 1970

3,495,934
METHOD FOR EXTRACTING RHENIUM FROM AQUEOUS SOLUTIONS
Siegfried Ziegenbalg and Siegfried Gerisch, Freiberg, Germany, assignors to Forschungsinstitut fuer Ne-Metalle, Freiberg, Germany
No Drawing. Filed Feb. 7, 1967, Ser. No. 614,406
Int. Cl. C01g 47/00; B01d 11/04
U.S. Cl. 23—22                                    6 Claims

ABSTRACT OF THE DISCLOSURE

The present invention relates to the extraction of rhenium from aqueous solutions by contacting the solution at specified pH values with an organic phase containing a secondary or tertiary amine as well as a solvent, and subsequent purification and extraction of the rhenium from that phase as rhenate (VII).

FIELD OF INVENTION AND PRIOR ART (1) The rhenium solutions are obtained by leaching ores, ore concentrates, flue dusts and other metallurgical intermediate products.

As a rule the solutions contain, apart from small amounts of rhenium, large amounts of metallic and non-metallic impurities so that technical methods of recovery must guarantee a selective separation of rhenium, a concentration thereof, as well as a high output. On the one hand, this prompts the attempts to simplify the refining process, following the recovery, in order to obtain rhenium compounds or rhenium metal of the highest purity; on the other hand, the aim is to utilize to the fullest degree the scant supplies.

(2) The known processes for the recovery of rhenium from aqueous solutions frequently have the drawback of providing only slightly selective separation and of unsatisfactory yields. As a rule, it is necessary to concentrate the technical solutions in view of their low rhenium contents by expensive vacuum evaporation, before they are capable of further processing. Moreover, the final stages of processes known up to now lead to potassium perrhenate as a compound of low solubility. However, in the technical processing and application of rhenium and its compounds, potassium is very disturbing as an impurity so that potassium perrhenate is, in most cases, unsuitable as a starting material for technical processing and use of rhenium.

More recent processes for the recovery of rhenium from aqueous solutions are its absorption by ion-exchange resins and active carbon as described by V. I. Bibikova et al. Rhenium, II. Arbeiten der Allunionstagung fur Rhenium-fragen, November 1962. "Nauka" Moskau 1964, pp. 44–49 and K. B. Lebedev and T. Turerodschaeva, Rhenium, II. Arbeiten der Allunionstagung fur Rhenium-fragen, November 1962. "Nauka" Moskau 1964, pp. 55–60, extraction with tributyl phosphate and water-insoluble alcohols, e.g. isoamyl alcohol, as described by V. I. Bikikova, et al., Rhenium, II. Arbeiten der Allunionstagung fur Rhenium-fragen, November 1962. "Nauka" Moskau, 1964, pp. 66–70, E. Scheffler and S. Ziegenbalg, Freib. Forschungschefte B 99, pp. 43–63, September 1964, and S. Tribalat, French Pat. 1,092,284, 1954; U.S. Pat. 2,855,-274, 1954. A shortcoming of the mentioned processes is the insufficient selectivity of the exchangers and extraction agents, as well as the high acid concentration ($6NH_2SO_4$) in aqueous solution in the case of isoamyl alcohol.

The extraction with tri-iso-octylamine dissolved in carbon tetrachloride as described by A. S. Kertes and A. Beck, J. Chem. Soc. (1961) 5, 1921–1930 is likewise unsuitable for recovery for technical purposes.

The problems involved in the prior art which are solved by the present invention, are therefore as follows. A method is to be developed for recovering rhenium from aqueous solutions of varying composition, which makes possible a quantitative separation of the metal, an elimination of impurities and a concentration of the metal during the process. The final product of the wet metallurgical process is to be ammonium perrhenate. The process is to permit the continuous work of large quantities of liquids with low rhenium contents and to lead to small amounts of liquid rich in rhenium, from which ammonium perrhenate is to be produced by crystallization.

SUMMARY OF INVENTION

The process according to the invention for the separation of rhenium from its aqueous solutions and for the recovery of ammonium perrhenate consists of mixing a rhenium-containing solution with a water-insoluble organic phase and passing the rhenium thereby from the aqueous into the organic or extract phase. After completed extraction, the two phases are separated and impurities entrained in the extraction are eliminated. In the following stage of the process, which is called re-extraction, the rhenium is passed from the organic phase into an aqueous solution, from which the rhenium compound is obtained by crystallization.

As organic phase or extract phase a solution of a secondary or tertiary amine in an inert diluent is used, consisting of a hydrocarbon, a higher ketone or an ether. Suitable inert diluents are e.g. kerosene, benzene, toluene, diisopropyl ketone, methyl isobutyl ketone, diisobutyl ketone, diisopropyl ether and others.

As solution-promoter this phase contains from 1–40% by weight of a higher aliphatic alcohol or a mixture of alcohols, the length of the carbon chain preferably ranging from 6 to 12 carbon atoms.

The extraction may be effected from $SO_4{}^{--}$, $Cl^-$, or $NO_3{}^-$-containing solutions or, if desired, with all three of the mentioned anions present in a pH range of 1–5.

The washing process for the removal of impurities from the extract phase is carried out with weakly ammoniacal aqueous solutions having a pH value, after washing, of 5–6.

The re-extraction of the perrhenate is carried out with an aqueous ammoniacal solution. With a $NH_3$-concentration $>1$ N (N=normal) rhenium is passed quantitatively from the extract phase into the aqueous re-extract phase. By evaporating the re-extract, concentrated rhenium solutions are obtained, from which crude ammonium perrhenate will crystallize. Depending on specifications of purity in any individual case, further purification of the metal compound can be effected by re-crystallization. Rinsing solutions and mother liquors containing rhenium are returned into the extraction process, so that rhenium losses are avoided to a very large extent.

Enrichment of rhenium is brought about in the stages of extraction and re-extraction by the choice of very different phase ratios. Thus, for instance, the extraction can be effected with a ratio of organic phase: aqueous phase=1:10, and the re-extraction in inverse ratio 10:1. In the example just mentioned, the result will be an enrichment by 100 times of rhenium in the re-extract, calculated on the rhenium concentration in the aqueous starting solution. At the same time, the volume of the re-extract is only 1% of the aqueous starting solution.

The optimal phase ratio of extraction and re-extraction to be chosen in each case of application depends on the composition of the starting solution and the desired degree of enrichment.

The recovery process proceeds continuously through the stages of extraction, washing the extract phase, re-extraction and concentration of the re-extract. For the exchange procedures between liquid phases, the countercurrent principle is preferably used.

Suitable devices are extraction columns with stirring equipment, pulsating extract columns, packed columns, and multistage mixer-separator plants.

DESCRIPTION OF PREFERRED EMBODIMENT

The invention will now be more fully described in an example of a preferred embodiment. This is given by way of illustration and not of limitation.

The Table I now following indicates the composition of a rhenium-containing aqueous liquor produced in the treatment of Pb-Zn-containing flue dust in a metallurgical plant.

TABLE I

| Element: | Concentration (g./l.) |
|---|---|
| Zinc | 8-12 |
| Cadmium | 1-2 |
| Lead | <0.005 |
| Thallium | 0.05-0.15 |
| Arsenic | 0.02-0.05 |
| Rhenium | 0.03-0.08 |
| Iron | <0.01 |
| Molydenum | <0.001 |
| Sulfate sulfur | 4-6 |
| Fluoride | 0.2-0.4 |
| Chloride | 8-12 |
| Bromide | <0.03 |
| Iodide | 0.01-0.02 |

The neutral solution is acidified with sulfuric acid (pH 3) and extracted with an amine-containing organic phase in the ratio of oP:aP=1:10, the organic phase having the composition

| | Percent by weight |
|---|---|
| Amine [$CH_3$—($CH_2$)$_{9-11}$]$_2$NH | 1 |
| Alcohol $CH_3$—($CH_2$)$_{5-8}$—OH | 30 |
| Solvent | 69 |

Extraction is performed in a column with stirring discs. Under proper operating conditions a quantitative separation of rhenium from the aqueous solution is possible in continuous operation.

Table II illustrates the composition of the extract phase.

TABLE II

| Element | Concentration, mg./l. | Contents obtained by washing, percent |
|---|---|---|
| Rhenium | 770 | |
| Arsenic | 55 | 50 |
| Cadmium | 48 | 98 |
| Zinc | 33 | 95 |
| Thallium | 3 | 35 |
| Lead | 5 | 98 |
| Iron | 5 | 95 |
| Sulfate-S | 20 | 70 |
| Fluoride | 111 | 45 |
| Chloride | 385 | 80 |
| Bromide | 125 | 95 |
| Iodide | 44 | |

The removal of impurities is brought about with ammoniacal rinsing solution. The ratio of extract phase:rinsing solution is 2:1 in continuous operation in a column with stirring discs. Column 3 of Table I indicates the amounts in percent which can be obtained from the extract phase by a rinsing operation.

The re-extraction of rhenium from the extract phase is performed with aqueous ammoniacal solution (4 N) in a phase ratio organic phase:aqueous phase=10:1. Under these conditions, a further 10-fold concentration of rhenium contained in the organic phase can be accomplished.

The ammoniacal extract with a rhenum concentration of 7.7 g./l. was concentrated by evaporation and the ammonium perrhenate was recovered as crude salt by crystallization.

Table III shows the contents of elements forming impurities in a recrystallized product.

TABLE III

| Element: | Concentration (p.p.m.) |
|---|---|
| Thalium | 39 |
| Iron | 7.1 |
| Zinc | 1.3 |
| Cadmium | <0.1 |
| Copper | <0.3 |
| Lead | <0.1 |
| Arsenic+phosphorus | <0.1 |
| Sulfur | 200 |

Extraction, purification of the organic phase, and re-extraction were carried out at temperatures from 5 to 20° C.

What is claimed is:

1. A process for the preferential recovery of rhenium in the heptavalent form from aqueous acidic solutions thereof containing other metal values and anions selected from the group consisting of chloride, sulfate, nitrate and mixtures thereof, which consists of (1) extracting the aqueous solution at pH 1-5 with an organic phase which consists of one aliphatic secondary or tertiary amine or a mixture of secondary aliphatic amines and an inert diluent, (2) purifying the organic phase by washing with a weakly ammoniacal solution whereby the pH is raised to 5-6, (3) re-extracting the rhenium therefrom with an aqueous ammoniacal solution of concentration greater than 1 N whereby a solution of ammonium perrhenate is obtained and (4) crystallizing ammonium perrhenate from said solution.

2. The process according to claim 1, wherein the amine is a mixture of secondary aliphatic amines of formula [$CH_3$—($CH_2$)$_{9-11}$]$_2$—NH.

3. The process according to claim 1, wherein the inert diluent is a member of the group which consists of hydrocarbons, higher ketones, and ethers.

4. The process according to claim 1, wherein the organic phase additionally contains 1-40% by weight of at least one higher aliphatic alcohol of 6-12 carbon atoms.

5. The process according to claim 1, wherein the steps of extraction, washing of the organic phase, and re-extraction are effected continuously according to the counter-current principle.

6. The process according to claim 1, wherein the extraction of aqueous by organic phase is effected at a ratio organic phase:aqueous phase 1:10 and the re-extraction in a ratio organic phase to aqueous phase 10:1.

References Cited

UNITED STATES PATENTS

| 2,955,932 | 10/1960 | Goren | 23—15.5 |
| 3,158,438 | 11/1964 | Kurtak | 23—22 |
| 3,223,476 | 12/1965 | Hart | 23—23 |
| 3,244,475 | 4/1966 | Churchwald | 23—22 |

OTHER REFERENCES

Kertes et al., "Journal of the Chemical Society," vol. 5, 1961, pp. 1926-1930.

HERBERT T. CARTER, Primary Examiner

U.S. Cl. X.R.

23—23, 24, 51